(12) United States Patent
Cochran

(10) Patent No.: US 8,403,622 B2
(45) Date of Patent: Mar. 26, 2013

(54) RADIAL-FLOW, HORIZONTAL-AXIS FLUID TURBINE

(75) Inventor: Bradley C. Cochran, Ft. Collins, CO (US)

(73) Assignee: Prime Energy Corporation, Reno, NV (US)

( * ) Notice: Subject to any disclaimer, the term of this patent is extended or adjusted under 35 U.S.C. 154(b) by 1498 days.

(21) Appl. No.: 11/345,931

(22) Filed: Feb. 1, 2006

(65) Prior Publication Data

US 2006/0177303 A1    Aug. 10, 2006

Related U.S. Application Data

(60) Provisional application No. 60/651,546, filed on Feb. 9, 2005.

(51) Int. Cl.
*F03D 7/00* (2006.01)
*F03D 7/06* (2006.01)

(52) U.S. Cl. .............. 415/2.1; 415/4.4; 416/178

(58) Field of Classification Search ............ 415/2.1, 415/4.3, 4.5, 4.1; 416/42, 178, 187, DIG. 4
See application file for complete search history.

(56) References Cited

U.S. PATENT DOCUMENTS

| | | |
|---|---|---|
| 4,781,523 A | 11/1988 | Aylor |
| 5,425,619 A | 6/1995 | Aylor |
| 5,553,996 A | 9/1996 | Farrar |
| 5,591,004 A | 1/1997 | Aylor |
| 5,632,599 A | 5/1997 | Townsend |
| 5,651,707 A * | 7/1997 | Lemont .................... 440/67 |
| 5,743,712 A | 4/1998 | Aylor |
| 5,863,180 A | 1/1999 | Townsend |
| 5,951,249 A | 9/1999 | Aylor |
| 6,177,735 B1 | 1/2001 | Chapman |
| 6,417,578 B1 | 7/2002 | Chapman et al. |
| 2005/0089403 A1 | 4/2005 | Ito et al. |

* cited by examiner

*Primary Examiner* — Dwayne J White
(74) *Attorney, Agent, or Firm* — Jon M. Dickinson, Esq.; Robert D. Varitz, Esq.

(57) ABSTRACT

A rotary, fluid-flow-to-mechanical/electrical power-conversion device including a generally cup-shaped, squirrel-cage rotor having a rotational axis, and including plural, circumferentially spaced, elongate, transverse-cross-sectionally arcuate airfoil (fluid-foil) blades sized and disposed about the rotational axis of the rotor with their respective long axes substantially paralleling the mentioned rotational axis. Blade-related dimensions and spacings are chosen whereby the ratio of blade-to-blade circumferential spacing a to blade transverse chord length b is characterized as one which: (a) resides in the general range of about 0.24 to about 0.4; or (b) resides, more preferably, within the somewhat narrower sub-range of about 0.25 to about 0.35 within the mentioned general range; or (c) has, even more preferably (for use in many if not most circumstances), a value of about 0.33.

3 Claims, 1 Drawing Sheet

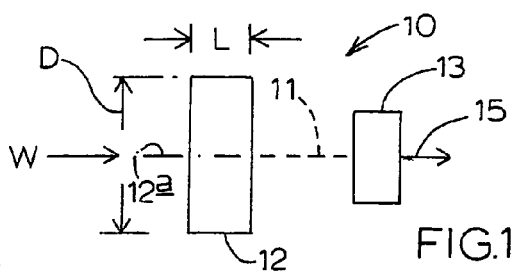
FIG. 1
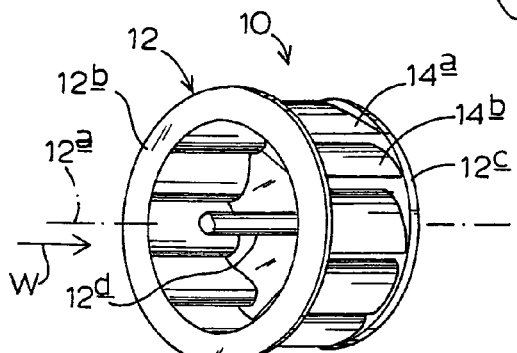
FIG. 2
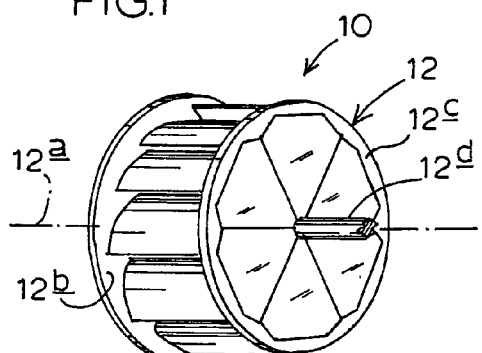
FIG. 3
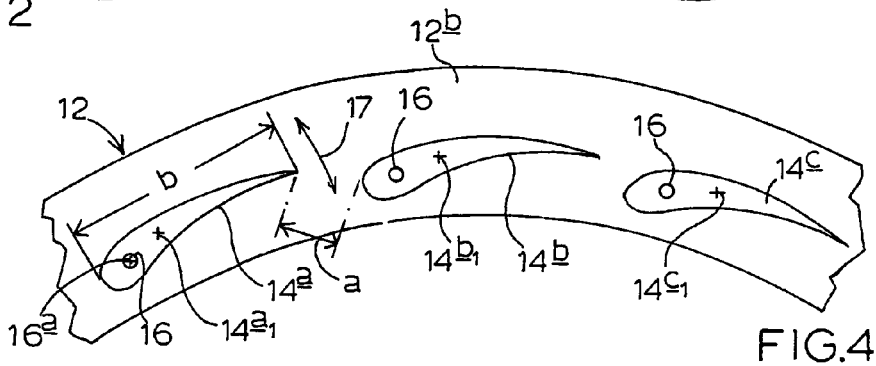
FIG. 4
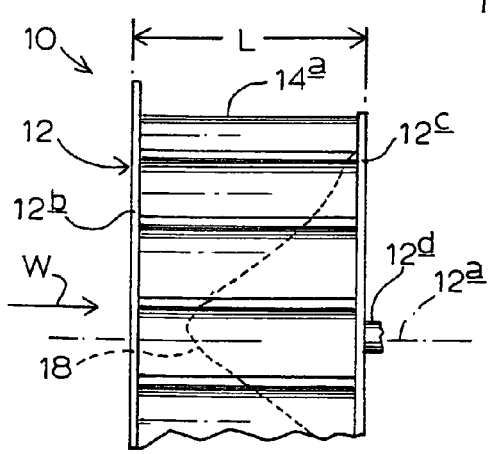
FIG. 7
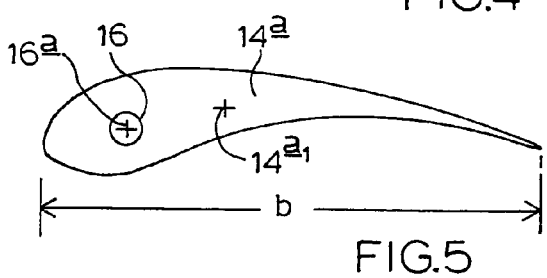
FIG. 5
FIG. 6

RADIAL-FLOW, HORIZONTAL-AXIS FLUID TURBINE

CROSS REFERENCE TO RELATED APPLICATION

This application claims priority to prior filed, U.S. Provisional Patent Application Ser. No. 60/651,546, filed Feb. 9, 2005, for "Radial-Flow, Horizontal-Axis Wind Turbine". The entire disclosure content of that provisional patent application is hereby incorporated herein by reference.

BACKGROUND AND SUMMARY OF THE INVENTION

This invention pertains to a radial-flow, horizontal-axis fluid turbine, also referred to herein as a rotary, fluid-flow-to-mechanical/electrical conversion device. More specifically, it relates to certain aerodynamic rotor features in such device which function to capture, efficiently, a relatively high percentage of mechanical energy resident in an oncoming fluid flow. For purposes of disclosure herein, a preferred and best mode embodiment of the invention is illustrated and described in the context of initially capturing wind(fluid)-flow energy for direct conversion to rotational-mechanical output power—a setting wherein the invention has been found to offer particular utility. The invention is additionally illustrated and described herein, in relation to this preferred embodiment, in the further useful context of converting such converted-to rotational-mechanical power to electrical output power. Thus, I use above, and elsewhere herein, the phrase "mechanical/electrical". I intend this phrase to mean either one of two things in the context of this patent application. They are: (a) conversion of fluid-flow power directly to rotational-mechanical power; or (b) conversion of fluid-flow power (through a phase of rotational-mechanical power) to electrical output power.

For many years, and now discussing the present invention and its background in the "world" of providing electrical power, there has been an extensive effort, still enthusiastically underway, to develop high-efficiency, fluid-driven, rotary, electrical-output systems capable of the high-efficiency capturing (for ultimate conversion to electrical power) of mechanical power resident in a flow of fluid, such as in a flow of wind. For electrical power-output purposes, captured fluid-flow power is first usually converted to rotational-mechanical power, and then further converted to ultimately useful electrical power. As those skilled in the art will recognize, efforts to achieve higher and higher efficiencies in this context, as well as in the predecessor context of developing purely rotational-mechanical power from fluid flow, have traditionally centered on improving various aerodynamic qualities of wind (fluid)-responsive rotary devices.

As will be seen, the present invention offers certain significant contributions in relation to such efforts—contributions which are believed to be important and useful in different fluid-flow-related, mechanical-output/electrical-output environments.

In particular, the present invention focuses on a certain, special, rotor-related dimensional ratio, and on certain, special rotor airfoil (fluid-foil) configurations, each of which features has been discovered to lead to an advance in the efficiency of extracting mechanical power from, for example, wind for the purpose thereafter of enabling an efficient fluid-flow to rotational-mechanical conversion of energy, as well as an ultimate (if desired) rotational-mechanical-to-electrical conversion of energy. A preferred embodiment of the invention, which also reflects a best known mode of implementing the invention, is described and illustrated herein wherein a particular numerical, dimensional ratio, and a special cross-section-transitioning airfoil (fluid-foil) blade configuration, independently make individual as well, when optionally combined, as collective improvements to wind-power-extraction capability and efficiency.

The preferred embodiment of the illustrated invention takes the form generally of a cup-shaped, squirrel-cage, rotational-mechanical-energy-developing rotor possessing a perimetral distribution of plural, circumferentially spaced, elongate airfoil (fluid-foil) blades whose long axes substantially parallel the rotational axis of the rotor. The rotor, which is suitably coupled (in an "ultimate", electrical-power-output setting which is specifically focused-upon herein for illustration purposes) to a rotary electrical generator (itself per se conventional), includes front and rear sides, with the front side being defined by a substantially planar, annular front ring occupying a plane which lies substantially normal to the rotor's rotational axis. The rotor's blades are, as just suggested, distributed circumferentially around this ring, and are attached to it with their long axes substantially normal to the plane of the ring. These blades extend rearwardly from the front ring toward the rear side of the rotor, which rear side is closed off by what is referred to herein as a back-plate structure. This back-plate structure, together with the portion of the rotor specifically including the airfoil blades, gives the rotor the mentioned cup-shaped configuration.

Each blade, as viewed transversely along its long axis, is arcuate in shape, and possesses, relative to that arcuate shape, a defined, transverse chord length which, along with blade-to-blade circumferential spacing, is another dimension that plays a role in the above-mentioned special dimensional ratio.

In one embodiment of the invention, each blade has substantially the same transverse cross-sectional configuration along its entire length. In another, alternative embodiment of the invention, the transverse curvature of each blade transitions from being (a) more arched near that end of the blade which is disposed adjacent the rear of the rotor, toward (b) a less arched configuration near the opposite end of the blade disposed adjacent the front of the rotor.

With respect to the special dimensional ratio mentioned above, this ratio is that of blade-to-blade circumferential spacing to blade transverse chord length.

Another feature of the invention, relative to a modified form thereof, includes the option of providing a forwardly facing nacelle located on the rotational axis of the rotor, with this nacelle being operable to provide a certain amount of horizontal-to-radial wind deflection with respect to oncoming wind.

To emphasize certain comments made above, it should be understood that the present invention may be structured and used both (a) purely for the conversion of fluid-flow power to rotational-mechanical power, as well as (b) for the additional conversion from rotational-mechanical power to electrical output power. For this reason, and as was suggested earlier, I use the phrase "mechanical/electrical" at certain location in the text of this application to emphasize this important point.

Other features and advantages that are offered by the present invention will become more fully apparent as the description which now follows is read in conjunction with the accompanying drawings.

DESCRIPTIONS OF THE DRAWINGS

FIG. 1 is a simplified, block/schematic diagram of a rotary, fluid-flow-to-mechanical/electrical power conversion device which has been constructed in accordance with a preferred and best mode embodiment of the invention.

FIG. 2 is a front, isometric view of a squirrel-cage rotor which is employed in the power conversion device of FIG. 1.

FIG. 3 is a rear isometric view of the rotor of FIG. 2.

FIG. 4 is an enlarged-scale, fragmentary view, taken generally along the rotational axis of the rotor of FIGS. 2 and 3, illustrating the rear side of a front ring in the rotor, to which ring are attached the forward ends of elongate, airfoil blades, three of which are shown in this figure, which blades form part of the rotor in the conversion device of this invention.

FIG. 5 is an enlarged, cross-sectional view of one of the airfoil blades included in the rotor of FIGS. 2-4, inclusive.

FIG. 6 is a view which is similar to, but smaller in scale than, the view presented in FIG. 4—here illustrating a modified form of the invention which features an arc-shape-transitioning-cross-section airfoil blade.

FIG. 7 provides a stylized, fragmentary, lateral elevation of a modified form of the power conversion device of the present invention, here possessing an optional, fluid-deflecting nacelle shown generally incorporated in the rotor of the conversion device.

It should be understood that components, and associated spacings and dimensions, shown in these drawings are not presented necessarily to scale.

DETAILED DESCRIPTION OF THE INVENTION

Turning attention now to the drawings, and referring first of all to FIGS. 1-4, inclusive, indicated generally at 10 is a rotary, fluid-flow-to-mechanical/electrical power conversion device which is made in accordance with a preferred and best mode embodiment of the present invention. This device is intended to convert power in a wind (fluid) flow, shown generally at W in FIGS. 1 and 2, to rotational-mechanical power for ultimate conversion, in one specific application of and for the present invention, to electrical power via rotation around the rotational axis $12a$ of a generally cup-shaped, squirrel-cage rotor 12 which has a front side that generally faces the viewer in FIG. 2, and a rear side that generally faces the viewer in FIG. 3. This rotor includes an annular, generally planar, front, flow-facing ring $12b$, a back-plate structure $12c$, and an elongate central shaft $12d$ which is centered with its long axis coincident with rotational axis $12a$. The plane of ring $12b$ lies substantially normal to axis $12a$. In illustrative device 10: the outside diameter D of rotor 12 is about 46-inches; the inside diameter (not specifically marked) of ring $12b$ is about 44-inches; and the axial length L of the rotor is about 23-inches.

Wind W flowing at and into the front side of rotor 12, with device 10 properly oriented for use, typically takes the form of a generally horizontal wind flow. Within rotor 12, this flow is converted to an outwardly directed radial flow over a plurality of circumferentially distributed and spaced airfoil blades which are elongate, transverse-cross-sectionally configured, arcuate structures, as can be seen for three of these blades at $14a$, $14b$, $14c$ in FIG. 4. This flow pattern, of course, results in powered, fluid-flow rotation of rotor 12 about its axis $12a$.

The long axes of blades $14a$, $14b$, $14c$ are shown at $14a_1$, $14b_1$, $14c_1$, respectively, and the arcuate, cross-sectional configurations just mentioned for these blades are presented (in the drawing figures) as they are seen when they are viewed substantially normal, respectively, to these long axes. In the particular embodiment of device 10 now being described, the total number of airfoil blades employed is sixteen, with each of these blades, along its entire length, having a consistent, transverse, arcuate cross-section preferably possessing, for this embodiment of the invention, the particular asymmetric shape which is clearly illustrated in FIG. 4 (see also FIG. 5).

Preferably further, though not necessarily, each of the airfoil blades, such as blades $14a$, $14b$, $14c$, has its opposite ends suitably mounted (journaled) for controlled, feathered, angular rotation (feathering) on the front and rear sides of rotor 12 through appropriate journal/rotational mountings, such as the journal/rotational mountings shown generally, and only schematically, at 16 in FIG. 4 in association with ring $12b$. The specific details of these journal/rotational mountings, and of the mechanism provided for rotationally feathering the blades so as to change their respective "angles of attack" regarding radial wind flow, are, and may be, entirely conventional in construction, and are therefore not detailed herein. As illustrated in FIG. 4, such feathering can take place generally as is shown for blade $14a$ by a double-ended, curved arrow 17. Arrow 17 curves about journal axis $16a$ shown in relation to blade $14a$ in this figure.

Rotor 12 in device 10 which, it will be understood, implements the purely fluid-flow to rotational-mechanical power conversion of the invention, is further shown herein suitably drivingly connected, as illustrated by a dashed line 11 in FIG. 1, to a conventional, rotary, mechanical-to-electrical generator 13, which generator, when driven by rotor 12, produces associated electrical power output, as suggested by arrow 15 in FIG. 1. In the particular conversion device 10 which is now being discussed and illustrated, this device, which, of course, includes conventional electrical generator 13, is capable of producing an electrical power output of about 500-watts when the velocity of wind W, axially directed into rotor 12, is about 13-meters-per-second. With respect to pure rotational-mechanical power output deliverable directly by rotor 12, these same wind-flow conditions, for the device now being described, produce a rotational-mechanical power output of about 555-watts.

Adding now specific reference to FIG. 5 along with FIGS. 1-4, inclusive, certain relevant, rotor-related dimensions which are important to the practice of the present invention are shown at a and b. Dimension a is referred to herein as blade-to-blade, circumferential spacing, and resides, in the particular structure illustrated herein, and under all operating (blade-feathered, fixed or moveable) conditions, generally within the range of about 1.5-inches to about 2.5-inches, depending upon the angular degree to which the associated airfoil blades are feathered (or otherwise "angled" relative to one another). Dimension a, as such is specifically shown herein, is about 2.0-inches.

Dimension b is what is referred to as the transverse chord length of each of the airfoil blades, and in the particular device now being described, dimension b is about 6.2-inches. Blade transverse chord length is consistent along the entire length of each blade.

In accordance with an important feature of the present invention, I have found that the ratio of a-to-b plays an important role in achieving high-efficiency conversion of fluid-flow power to rotational-mechanical power, and thus in achieving, ultimately, high-efficiency fluid-flow-power to electrical-power conversion. In this context, I have specifically found that a very useful a-to-b ratio lies in the range, most generally, of about 0.24 to about 0.4. More preferably, and as I have further determined it, this ratio lies within the somewhat narrower subrange of about 0.25 to about 0.35. Even more preferably, I have found that an excellent, particular ratio which is useable very successfully in many, if not most, circumstances is about 0.33. Such attention to the a-to-b ratio I have found, as just mentioned above, to contribute significantly to improved efficiency in the ultimate fluid-flow-power to mechanical/electrical-power conversion performance of device 10.

Turning attention now to the remaining two drawing figures, 6 and 7, these two figures show two modified forms of the present invention. Beginning with FIG. 7, this figure illustrates at 18 the outline, or lateral, transverse profile, of a wind-flow-deflecting nacelle. Nacelle 18 possesses a transverse-curvilinearly-profiled body of revolution (schematically shown as a single-line outline) substantially centered on rotor rotational axis 12a with the nacelle being disposed within the hollow interior (the "cup", so-to-speak) of rotor 12. Nacelle 18 aids in deflecting wing flow from "input-axial" to "output-radial", and can, in certain instances, cooperate with the dimensional ratio feature discussed above to help improve fluid-power-capture efficiency. Those skilled in the art will recognize that various, different, specific nacelle body-of-revolution "profiles" (i.e., transverse body-of-revolution "profiles") may be employed to suit different operating and use circumstances.

FIG. 6 in the drawings shows a modified airfoil blade form 20 which has a long axis 21 which is normal to the plane of FIG. 6, and what is referred to herein as a transitioning, transverse (i.e., generally normal to each blade's long axis) cross-sectional curvature, or arc-shape-transitioning-cross-section. This cross-section is more arched (see dashed line 20a) at that end of the blade which is directly adjacent rotor back-plate structure 12c, and is less arched (see solid line 20b) near rotor front ring 12b. Such an arc-shape-transitioning blade configuration offers, for each of the blades in device 10, an infinitely varying range of angles of attack at the leading edge of the blade, and infinitely varying air-foil paths measured over the opposite, broad sides of the blade and along its length. These "paths" are longer near the rear of rotor 12, and shorter near the front of the rotor. This modified form of the invention can offer, in certain instances, and in cooperation with one or more of the other, previously mentioned invention features, still further improvements in fluid-power-capture efficiency.

Thus, the invention, in its preferred and best mode form, offers a unique rotary, fluid-flow-power-to-mechanical/electrical-power conversion device including a generally cup-shaped, squirrel-cage rotor, wherein certain, important, relevant dimensions, and ratios thereof, are established to improve the power-conversion efficiency of such a device. The device of the invention, as described above, can be constructed with components having various different overall sizes depending upon the particular application to be addressed. Modified forms of the invention have been discussed which feature additional structural configurations that definitively can enhance the efficiency of performance in various operating conditions.

Those skilled in the art will recognize that, within this field of art, there are many rotary conversion devices which are generally squirrel-cage-like in configuration, but there are none known to applicant which, among other things, possess and utilize the special dimensional ratio concepts described above herein. Within the preferred dimensional-ratio ranges, etc. described hereinabove, there is room for thoughtful variation in specific device design to suit different power-conversion applications, and those possessing skill in the art will certainly recognize that such variations and modifications may be made without departing from the spirit of the invention.

I claim:

1. A rotary, fluid-flow-to-mechanical/electrical power-conversion device comprising
    a generally cup-shaped, squirrel-cage rotor having a rotational axis, a flow-facing front ring, and plural, circumferentially spaced, elongate, transverse-cross-sectionally arcuate airfoil blades having long axes, and attached to said ring in a manner which accommodates angular-rotational feathering of the blades of about their respective long axes, said blades further having leading and trailing edges, and being sized and disposed about the rotational axis of the rotor with their respective long axes substantially paralleling said rotational axis, and
    selected dimensioning in said rotor whereby the ratio of blade-to-blade, trailing-edge-to-leading-edge spacing a to blade transverse chord length b resides in a general range of about 0.24 to about 0.4.

2. A rotary, fluid-flow-to-mechanical/electrical power-conversion devise comprising
    a generally cup-shaped, squirrel-cage rotor having a rotational axis, a flow-facing front ring, and plural, circumferentially spaced, elongate, transverse-cross-sectionally arcuate airfoil blades haying long axes, and attached to said ring in a manner which accommodates angular-rotational feathering of the blades of about their respective long axes, said blades further having leading and trailing edges, and being sized and disposed about the rotational axis of the rotor with their respective long axes substantially paralleling said rotational axis, and
    selected dimensioning in said rotor whereby the ratio of blade-to-blade, trailing-edge-to-leading-edge spacing a to blade transverse chord length b resides within a general range of about 0.24 to about 0.4 with a value of about 0.33.

3. A rotary, fluid-flow-to-rotational-mechanical power-conversion device comprising
    a generally cup-shaped, squirrel-cage rotor having a rotational axis, a flow-facing front ring, and plural, circumferentially spaced, elongate, transverse-cross-sectionally arcuate airfoil blades having long axes, and attached to said ring in a manner which accommodates angular-rotational feathering of the blades of about their respective long axes, said blades further having leading and trailing edges, and being sized and disposed about the rotational axis of the rotor with their respective long axes substantially paralleling said rotational axis, and
    selected dimensioning in said rotor whereby the ratio of blade-to-blade, trailing-edge-to-leading-edge spacing a to blade transverse chord length b resides in the general range of about 0.24 to about 0.4.

* * * * *

UNITED STATES PATENT AND TRADEMARK OFFICE
CERTIFICATE OF CORRECTION

PATENT NO. : 8,403,622 B2  
APPLICATION NO. : 11/345931  
DATED : March 26, 2013  
INVENTOR(S) : Cochran Page 1 of 1

It is certified that error appears in the above-identified patent and that said Letters Patent is hereby corrected as shown below:

In the Claims:

Column 6, line 26, claim 2, "devise" should read --device--.

Column 6, line 30, claim 2, "haying" should read --having--.

Signed and Sealed this
Twenty-eighth Day of May, 2013

Teresa Stanek Rea
*Acting Director of the United States Patent and Trademark Office*